P. HAAS.
VENTILATING WATER CLOSET.
APPLICATION FILED JULY 19, 1912.
1,111,746.
Patented Sept. 29, 1914
2 SHEETS—SHEET 2.
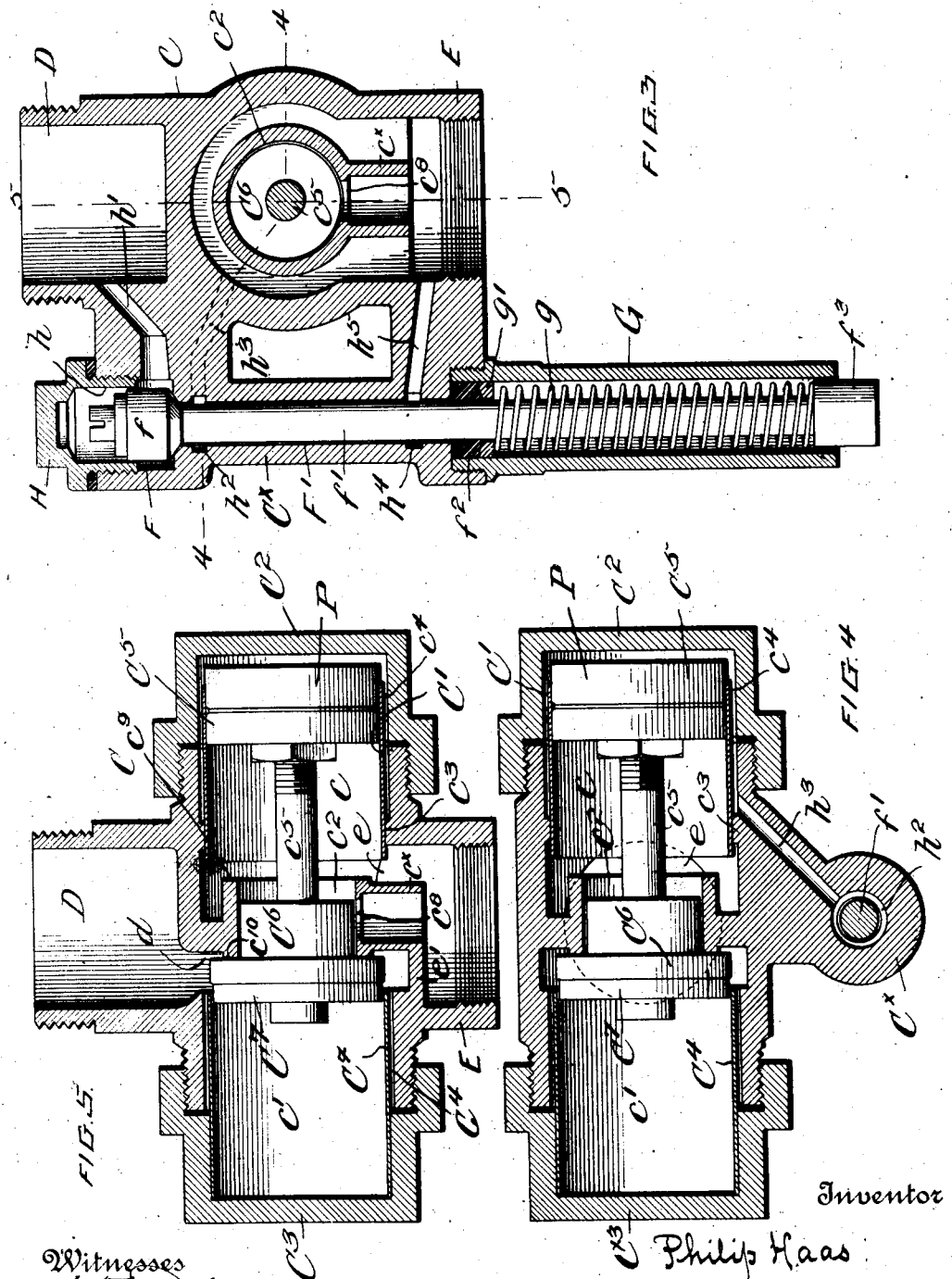

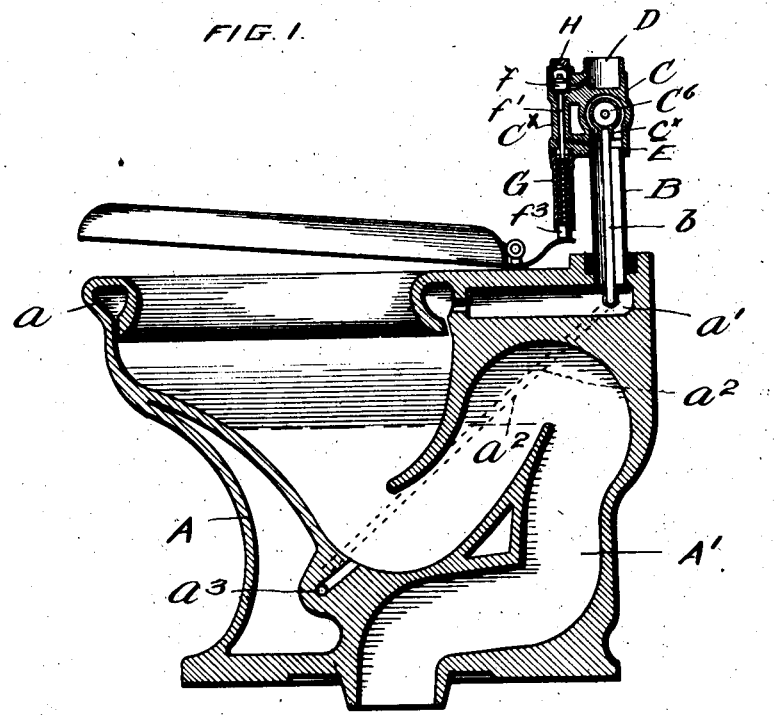
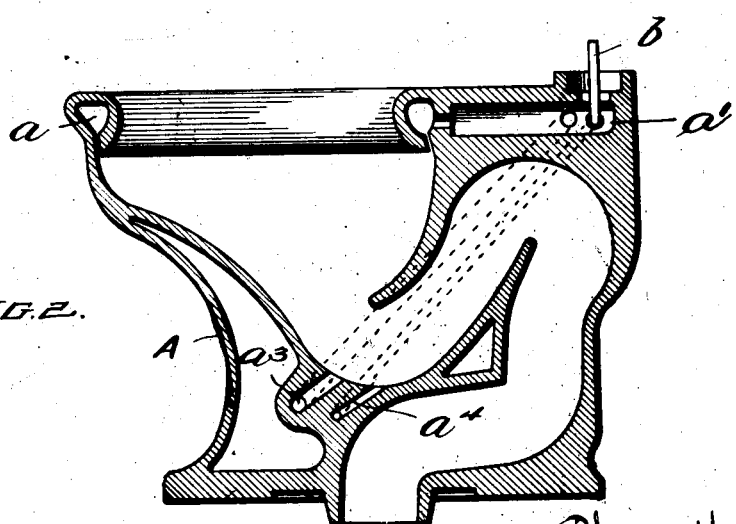

UNITED STATES PATENT OFFICE.

PHILIP HAAS, OF DAYTON, OHIO.

VENTILATING WATER-CLOSET.

1,111,746.   Specification of Letters Patent.   Patented Sept. 29, 1914.

Application filed July 19, 1912. Serial No. 710,507.

*To all whom it may concern:*

Be it known that I, PHILIP HAAS, a citizen of the United States, residing at Dayton, in the county of Montgomery and State of Ohio, have invented certain new and useful Improvements in Ventilating Water-Closets; and I do hereby declare the following to be a full, clear, and exact description of the invention, such as will enable others skilled in the art to which it appertains to make and use the same.

My invention consists in the novel features hereinafter described, reference being had to the accompanying drawings which illustrate one embodiment of my invention, selected by me for the purpose of illustrating the same, and said invention is fully disclosed in the following description and claims.

My invention relates particularly to water closets in which the bowl is provided with a discharge passage so constructed as to form a trap and normally contain a quantity of water which seals the trap and prevents egress of gas from the soil pipe with which the trap is directly connected.

The object of my invention is primarily to provide means whereby the liquid seal in the trap can be broken and a stream of water discharged through the empty trap to the soil pipe, before the apparatus is used, so as to act after the manner of an injector and withdraw volumes of air continuously from and through the bowl and trap and discharge the same through the soil pipe to the sewer for the purpose of ventilating the bowl and preventing any contamination whatever of the atmosphere of the room in which the apparatus is located.

In its preferred form, as for example, in the apparatus herein shown and described, I prefer to provide means for moistening the walls of the bowl above the level of the water seal, and which being in contact with the air, become dry, at the same time that the injector stream is discharged through the trap, for the purpose of breaking the water seal and withdrawing the air in large quantities, through the bowl, and I also prefer to provide means for flushing the bowl after it has been used, in the ordinary manner, and for restoring the water seal. In its preferred form, I provide mechanism for automatically insuring the sequence of operations above described and as it is possible that any manually operated devices might be neglected if their use depends upon the care and personal attention of users of the apparatus, I prefer to actuate the apparatus by the depression of the closet seat in order that the before mentioned automatic and sequential operation of the apparatus shall take place certainly and without the necessity for conscious act or attention on the part of the user.

It is to be noted in connection with my improved apparatus that it does not add to or complicate the usual plumbing connections which in most instances would bring about unsanitary conditions and conflict with the severe plumbing regulations controlling the installation of this class of apparatus. No supplemental or auxiliary ventilating pipe is required, but on the contrary air is discharged through the trap and soil pipe to the sewer. It is also to be noted that the ventilating action takes place before the normal use of the apparatus, which is essential, and continues without interruption until the apparatus is flushed and the liquid seal is automatically restored.

The new results accomplished by my invention are very important and far reaching, as they enable an apparatus of this kind to be installed in places where they could not otherwise be placed, as for example, in a sick room, in hospital bedrooms, and the like, without the slightest danger of contaminating the atmosphere of the room at any time, and moreover my improved apparatus may be employed as an active agent for securing the ventilation of the room in which it is located, for, as will be readily understood, the operation of the device withdraws such large quantities of air from and through the bowl that by bringing it into operation by hand or otherwise when the device is not used in the normal manner, the entire atmospheric contents of the room can be withdrawn and discharged, thus forcing the room to fill with fresh air from outside through the doors and windows.

In the said drawings, Figure 1 is a vertical sectional view of the bowl with its connected parts partially in section. Fig. 2 is a sectional view of a modified construction of bowl. Fig. 3 is a vertical sectional view of the valve casing and the parts to be moved from the seat to put the valve into operation. Fig. 4 is a horizontal sectional view of the valve casing on line 4—4, Fig. 3, and Fig. 5 is a vertical sectional view on the line 5—5, Fig. 3.

In the drawings, A indicates the bowl, B the pipe for supplying the water to flush the bowl after the same has been used. This pipe communicates through a main flushing passage $a'$ to the flushing rim $a$ of the bowl.

$A'$ is the outlet of the bowl which is constructed as is usual to form a water seal for the bowl.

$b$ is a pipe preferably located within the pipe B. The lower end of this pipe connects with the jet or trap passage $a^2$ leading to the jet $a^3$ at the bottom of the bowl. This jet is also a well known feature of construction but is used by me to perform different and additional functions.

The upper end of the pipe $b$ connects with a short tubular chamber or thimble $c$ within the valve casing C. The valve casing C is provided with the water inlet, consisting of the projecting tubular portion D adapted to be connected with a water supply and a projecting tubular portion E adapted to be connected with the pipe B and forming the outlet of the valve.

The interior of the valve casing is divided into two main chambers $c, c'$ connected by a tubular passage $c^2$ having a valve seat $c^9$ at one end and a valve seat $c^{10}$ at the other end. Near the inner end of the same the chamber $c$ is provided with the inwardly extending bead $c^3$ and to this bead is secured the tube or cylinder C' leaving a space $c^4$ between the cylinder and the wall of the chamber. The outer end of the chamber is closed by a cap $C^2$. The chamber $c'$ is closed by the cap $c^3$ in which is fitted the guiding tube or cylinder $C^4$ which when the cap is in place, extends to nearly the inner end of the chamber.

Within the cylinder C' is the piston P to which is secured a valve rod or stem $c^5$ which also carries two valves $C^5, C^6$, located on opposite sides of the cylindrical passage $c^2$ to engage the valve seats $c^9, c^{10}$ respectively and said rod is also provided with a guiding disk $C^7$ which engages the guiding cylinder $C^4$, there being sufficient space between the wall of the guiding cylinder and said disk and the valve $C^6$ to permit the passage of air, so as not to interfere with the movements of the piston and valves. The valves $C^5$ and $C^6$ are separated a distance greater than the seats $c^9, c^{10}$ so that only one can be in engagement with its seat at a time and in this instance the valve $C^5$ is located in rear of the piston P, the piston and valve $C^5$ having a threaded engagement with the valve rod for adjusting the distance between said valves.

The inner end of the chamber $c'$ is connected with the interior of the tubular projection D by the passage $d$. The chamber $c$ is connected with the interior of the tubular projection E through the passage $e$ which forms the main water outlet. The tubular chamber or thimble extends into this passage and its lower end is connected by an arm $e'$ to a wall of the chamber $c'$. Any water admitted to the passage $e$ flows downward through E to the pipe B and the flushing rim of the bowl. The underside of the passage $c^2$ is provided with an auxiliary outlet aperture $c^8$ opening into the chamber or thimble $c$ and connected by pipe $b$ with the jet passage $a^2$.

At one side of the valve casing C is a valve chamber and passage F, F' formed in a cylindrical body $C^x$ preferably made integrally with the said casing and forming a bypass between the water inlet and main outlet, around the tubular passage $c^2$. Within the valve chamber is a valve $f$ mounted upon a rod $f'$ that extends downwardly through the passage F' and through a stuffing box $f^2$ at the bottom of the passage F'; thence downward through a coiled spring $g$ and a casing G secured to the lower end of the body $C^x$ within which are the valve $f$ and rod $f'$. At the lower end, the rod $f'$ is provided with a cap $f^3$. One end of the spring $g$ rests upon the top of the cap $f^3$ while the opposite end bears against a collar $g'$ fixed within the casing G and forming a part of the stuffing box. This spring permits the valve $f$ and the valve rod $f'$ to be raised and the cap $f^3$ is arranged above an arm $s$ connected with the seat S so that it will be engaged and raised whenever the seat is depressed. The spring $g$ obviously maintains the seat in raised position as shown.

The upper end of the valve chamber F is closed by a cap H provided with the outwardly extending tubular projection $h$, which is exteriorly threaded and is screwed into the valve chamber F. The valve $f$ is loosely fitted to the interior of this projection of the cap and moves within it, being guided thereby. The valve chamber below the extension of the cap is of larger diameter than the interior of the cap and this portion of the chamber is connected by a passage $h'$ with the interior of the tubular extension D. The valve $f$ seats upon the walls of and closes the passage $f'$. Immediately below the said valve seat the passage F' is enlarged and this enlargement $h^2$ is connected by passage $h^3$ with the space $c^4$ around the cylinder C' in the chamber $c$. The passage $f'$ is also correspondingly enlarged at $h^4$ and this enlarged portion is connected by a passage $h^5$ with the outlet E of the valve casing.

The operation of the device is as follows: When the seat is depressed the rod $f'$ is moved upward raising the valve $f$ from its seat. Water then flows into the valve chamber F through the passage $h'$, thence through the passage F' and passage $h^3$ into the space $c^4$ between the cylinder C' and the interior of the casing, filling the outer end of chamber $c$. As water accumulates in chamber $c$ the piston $C^5$ is forced inwardly moving the valve $C^6$ from the valve seat $C^{10}$. As soon as the valve $C^6$ is free from the passage $c^2$, water enters said passage, a part flowing downward through the auxiliary outlet $c^3$, pipe $b$, passage $a^2$ and jet $a^3$, and a part flowing into the chamber $c$ and thence downward through the passage $e$ to the main outlet E and through the pipe B to the flushing rim, for a preliminary flushing of the bowl. The water discharged through the flushing rim will wet the side walls above the water level in the trap and the water flowing through the jet will start the siphonic action of the trap and empty the trap, the jet nozzle thereafter discharging a strong jet through the empty trap which acts as an injector and draws large volumes of air from and through the bowl and discharges the same through the soil pipe, thus preventing any contamination of the atmosphere of the room in which the apparatus is located. The preliminary flushing action continues until the piston causes the valve $C^5$ to seat itself against the valve seat $c^9$ at the end of the passage $c$, thus closing the same and stopping the flow therethrough to the flushing rim. The flow of water through the pipe $b$ however continues and the jet nozzle $a^3$ is thus continuously supplied during the entire time that the seat is depressed, thus continuing the ventilating action. When the seat is released, the valve $f$ is drawn down upon its seat by the spring $g$ and the connection from the water supply to the chamber $c$ by way of passage $L^3$ is closed. The pressure upon the inner face of the valve $C^5$ will then force the piston P backward and away from the end of the passage $c^2$. When the valve $c^5$ leaves the seat $c^9$ at the end of the passage $c^2$ water from the supply will flow from D, through $d$, the passages $c^2$ and $e$, the pipe B to the flushing rim of the bowl, cleansing the bowl and its outlet, and reëstablishing the seal therein. As the piston P and valve $C^5$ move away from the passage $c^2$ the water in the chamber $c$ is forced outward through passages $h^3$, F', $h^5$ to the valve outlet E, until the movable parts of the valve will resume their normal positions.

It will be seen that by the means herein described, the odor impregnated air and gases will pass out through the usual outlet of the closet and that these parts of the device will be thoroughly cleansed by the flushing of the closet after each use of the same.

It will be further seen that the jet or jets of water for removing foul air or gases are in operation during the entire time that the seat is occupied or depressed, and thereby the operation of my improved closet is made as complete and effective as possible.

It will also be seen that instead of a single jet in the bottom of the bowl I may use a plurality of the same, an example of such a construction being shown in Fig. 2. In this figure two such jets $a^3$ and $a^4$ are shown. When more than one is employed, I preferably position one or more to direct its current upon the bottom of the outlet to increase the action of the outgoing current upon the bottom of the outlet and assist in carrying away the heavier parts of the contents of the bowl.

It is also apparent that my device can be readily applied to closets that have already been set up and used.

As before stated the apparatus can be utilized by depressing the seat by hand or otherwise at any time, to set up the ventilating action before described, in which case it will rapidly withdraw large volumes of air from the room and discharge it through the soil pipe, necessitating the admission of sufficient air to the room through the doors and windows or other openings therein.

The specific details of the valve mechanism herein shown and described for carrying out my improved invention are not herein specifically claimed, the same being reserved to form the subject-matter of another application.

What I claim and desire to secure by Letters Patent is:—

1. The combination with a closet bowl provided with a discharge for fecal matter having a trap portion to contain a liquid seal, of means for discharging water through said trap to break the liquid seal and empty the trap and for thereafter continuously discharging an injector stream through the empty trap and shutting off the admission of water to the bowl from any other source thus preventing the refilling of the trap, to withdraw large quantities of air from and through the bowl and discharge it through said trap and discharge passage, and for thereafter discharging water into the bowl above the point of communication of the injector discharge passage with the bowl, while continuing the discharge of the injector stream, to flush the bowl, and finally shutting off the supply of water to the bowl, to permit it to refill, and restore the liquid seal.

2. The combination with a closet bowl provided with a discharge passage for fecal matter, having a trap portion to contain a liquid seal, said bowl being provided with a jet discharge aperture for discharging water longitudinally through said trap, and a flushing discharge aperture communicating with the bowl above the jet aperture, of means for supplying water through one of said discharge apertures to break the liquid seal and empty the said trap and for thereafter continuously discharging an injector stream from said jet aperture through the empty trap, and preventing the discharge of water through the flushing aperture to prevent the refilling of the trap, to withdraw large quantities of air from and through the bowl and discharge it through said discharge passage and said trap, and for thereafter supplying water to the flushing aperture to flush the bowl and restore the liquid seal.

3. The combination with a closet bowl provided with a discharge passage for fecal matter, having a trap portion to contain a liquid seal, said bowl being provided with a jet discharge aperture discharging longitudinally through said trap, and a flushing discharge aperture communicating with the bowl above the liquid level of the liquid seal, of means for discharging water through both of said apertures to wet the walls of the bowl above the liquid seal and empty the trap, and for shutting off the supply of water to the flushing discharge aperture while continuing the supply to the jet, to continuously discharge an injector stream through the empty trap while preventing the refilling of said trap to withdraw large quantities of air from and through the bowl and discharge it through said trap and discharge passage, and for thereafter again supplying water to said flushing discharge aperture to flush the bowl and restore the liquid seal, and for finally cutting off the supply of water to the bowl.

4. The combination with a closet bowl provided with a discharge passage for fecal matter, having a trap portion to contain a liquid seal, said bowl being provided with a jet discharge aperture discharging longitudinally through said trap, and a flushing discharge aperture communicating with the bowl above the liquid level of the liquid seal, of means for discharging water through both of said apertures to wet the walls of the bowl above the liquid seal and empty the trap, and for shutting off the supply of water to the flushing discharge aperture while continuing the supply to the jet to continuously discharge an injector stream through the empty trap while preventing the refilling of said trap to withdraw large quantities of air from and through the bowl and discharge it through said trap and discharge passage, and for thereafter again supplying water to said flushing discharge aperture to flush the bowl and restore the liquid seal, while continuing the supply of water to the jet and for finally cutting off the supply of water to both discharge apertures.

5. The combination with a closet bowl provided with a discharge passage for fecal matter having a trap portion to contain a liquid seal, said bowl being provided with a jet discharge aperture for discharging water longitudinally through said trap, and a flushing discharge aperture located above the level of the jet aperture, of automatic means for supplying water to one of said apertures to break the liquid seal and empty the said trap, and for thereafter continuously discharging an injector stream from said jet aperture through the said empty trap, and preventing the discharge of water through the flushing aperture to prevent the refilling of the said trap, to withdraw large quantities of air from and through the bowl and discharge it through said trap and discharge passage, and for thereafter supplying water to the flushing aperture, while continuing the discharge from the jet aperture, to flush the bowl, and for thereafter cutting off the supply of water to the bowl to permit it to refill, and restore the liquid seal, whereby said operations will automatically take place in sequential order.

6. The combination with a closet bowl provided with a discharge passage for fecal matter, having a trap portion to contain a liquid seal, said bowl being provided with a jet discharge aperture for discharging water longitudinally through said trap, and a flushing discharge aperture located above the level of the jet aperture, of automatic means for supplying water to one of said apertures to break the liquid seal and empty the said trap, and for thereafter continuously discharging an injector stream from said jet aperture through the said empty trap, while preventing the refilling of the said trap, to withdraw large quantities of air from and through the bowl and discharge it through said trap and discharge passage, and for thereafter supplying water to the flushing aperture to flush the bowl and restore the liquid seal, and thereafter cutting off the supply of water to the bowl, whereby said operations will automatically take place in sequential order, and a device actuated by the weight of the user for controlling said automatic means, without the necessity for conscious attention on the part of the user.

7. The combination with a closet bowl provided with a discharge passage for fecal matter, having a trap portion adapted to receive a liquid seal, said bowl being provided with a jet discharge aperture for discharging water through the said trap, and a flushing discharge aperture communicating with the bowl above the jet aperture, of an operating device actuated in one direction by the weight of the user, restoring means for returning said operating device to its normal position, means brought into operation by the movement of said operating device when actuated by the weight of the user for supplying water to the bowl to break the liquid seal and empty the said trap, and thereafter continuously discharge an injector stream from said jet discharge aperture through the said empty trap, while preventing the refilling of the said trap, to withdraw large quantities of air from and through the bowl and discharge it through said trap and discharge passage during the initial and continued use of the apparatus, said means being operable by said operating device when actuated by said restoring means, for supplying water to the flushing discharge aperture for flushing the bowl and restoring the liquid seal and for finally shutting off the supply of water to the bowl.

8. The combination with a closet bowl provided with a discharge passage for fecal matter, having a trap portion adapted to contain a liquid seal, said bowl being provided with a jet discharge aperture adapted to discharge water longitudinally through said trap, and with a flushing aperture communicating with the bowl above the liquid level of the liquid seal, a hinged depressible seat, and restoring means for normally maintaining it in and restoring it to elevated position, automatic valve mechanism for supplying water to one of said discharge apertures for breaking the liquid seal and emptying the said trap, and thereafter discharging an injector jet through said empty trap continuously to withdraw air from and through the bowl and discharge it through said trap and discharge passage, while preventing the refilling of the bowl and for thereafter admitting water to said flushing discharge aperture to flush the bowl and restore the liquid seal, and for finally cutting off the supply of water to the bowl, and operative connections between the said seat and said valve mechanism for controlling the operation thereof, without conscious attention from the user.

9. The combination with a closet bowl provided with a discharge passage for fecal matter having a trap portion adapted to contain a liquid seal, said bowl being provided with a rim flush discharge above the liquid level of the liquid seal, and a jet flush for discharging water through the said trap, of automatic valve mechanism for admitting water to the rim flush and jet flush simultaneously to wet the walls of the bowl above the liquid seal and empty the trap, for cutting off the rim flush and continuing the discharge of the injector stream from the jet flush through said empty trap during the use of the apparatus, to withdraw air from and through the bowl and discharge it through said trap and discharge passage while preventing the refilling of the trap, and for restoring the operation of the rim flush without discontinuing the discharge from the jet flush, after the use of the apparatus to flush the bowl and restore the liquid seal, a pivoted seat mounted on said bowl, yielding means for maintaining it normally in and restoring it to elevated position, and operative connections between said seat and said valve mechanism for controlling the operation of said valve mechanism.

10. The combination with a water closet bowl having a discharge passage provided with a trap portion adapted to receive a liquid seal, a rim flush passage discharging above the level of the water seal and a jet passage discharging into the trap portion, of a water supply controlling valve for said bowl provided with a water inlet, a main water outlet connected with the rim flush passage, an auxiliary outlet connected with the jet passage, and valves interposed between the inlet and said outlets, and means for automatically operating said valves to discharge water through both of said outlets and thereafter cut off the main outlet, while continuing the discharge from the auxiliary outlet before and during the normal use of the closet and for automatically reopening said rim flush outlet to flush the bowl after use and restore the liquid seal, and finally closing both of said outlets.

11. The combination with a water closet bowl having a discharge passage provided with a trap portion adapted to receive a liquid seal, a rim flush passage discharging above the level of the liquid seal and a jet passage discharging into the trap portion, of a water supply controlling valve for said bowl provided with a water inlet, a main water outlet connected with the rim flush passage, an auxiliary outlet connected with the jet passage, valves interposed between the inlet and said outlets, and means for automatically operating said valves to first discharge water through both of said outlets and thereafter cut off the main outlet, while continuing the discharge from the auxiliary outlet before and during the normal use of the closet and for automatically reopening said rim flush outlet while continuing the discharge from the auxiliary outlet, to flush the bowl after use and restore the liquid seal, and finally closing both of said outlets, and a depressible device operable by the weight of the operator for controlling said valve mechanism for effecting the sequential operation thereof without conscious action on the part of the user.

In testimony whereof I affix my signature, in the presence of two witnesses.

PHILIP HAAS.

Witnesses:
Wm. F. Doyle,
J. K. Moore.